United States Patent [19]

Schantz

[11] Patent Number: 4,511,181
[45] Date of Patent: Apr. 16, 1985

[54] TILT BED VERTICALLY STORABLE UTILITY TRAILER

[75] Inventor: Raymond G. Schantz, Marine, Ill.

[73] Assignee: Schantz & Sons, Inc., Marine, Ill.

[21] Appl. No.: 472,588

[22] Filed: Mar. 7, 1983

[51] Int. Cl.³ .............................................. B60P 1/04
[52] U.S. Cl. ...................................... 298/5; 280/656; 296/39 R; 296/100; 296/184
[58] Field of Search ...................... 296/10, 32, 36, 181, 296/182, 100, 39 R, 184; 298/5, 17 B, 23 C, 38; 280/656; 410/6; 414/480, 482, 483, 484, 485

[56] References Cited

U.S. PATENT DOCUMENTS

| | | | |
|---|---|---|---|
| 1,259,138 | 3/1918 | Sachs | 296/39 R |
| 1,305,995 | 6/1919 | Drew | |
| 2,491,417 | 12/1949 | Pflantz | |
| 2,495,354 | 1/1950 | Spearing et al. | |
| 2,751,248 | 6/1956 | Kritser | 296/32 |
| 2,803,362 | 8/1957 | Saenz | |
| 2,879,072 | 3/1959 | Rear | |
| 2,911,253 | 11/1959 | Dewey | 296/39 R |
| 3,016,268 | 1/1962 | Hadden | |
| 3,024,063 | 3/1962 | Robinson | 296/100 |
| 3,044,653 | 7/1962 | Tantlinger | 296/100 |
| 3,053,572 | 9/1962 | Harper | |
| 3,117,820 | 1/1964 | Toland | 298/38 |
| 3,620,397 | 11/1971 | Gagnon | 414/482 |
| 3,731,974 | 5/1973 | Stafford | 298/5 |
| 3,977,726 | 8/1976 | Prestayko | 298/5 |
| 4,239,258 | 12/1980 | Burris | |
| 4,362,316 | 7/1982 | Wright | |

FOREIGN PATENT DOCUMENTS 2089293 6/1982 United Kingdom ............... 280/656

Primary Examiner—Leslie J. Paperner
Assistant Examiner—Lyle Kim
Attorney, Agent, or Firm—Glenn K. Robbins

[57] ABSTRACT

A utility trailer for vehicles having a tilt bed and vertical storing capability. The trailer has a tongue pivotally connected to the trailer to provide for three positions, namely, a hitch towing position, a tilted bed position and vertically storing position wherein the trailer is vertically positioned on end and the tongue is pivoted through an oblique angle to form a rigid tripod support. Automatic latch means are provided for locking the hitch and vertical storing positions. Removable stakes are provided for the bed with means for securing an internal liner and external cover. The stakes may be removed and stored in the vertical storing position between the wheel axle and the trailer bed.

6 Claims, 11 Drawing Figures

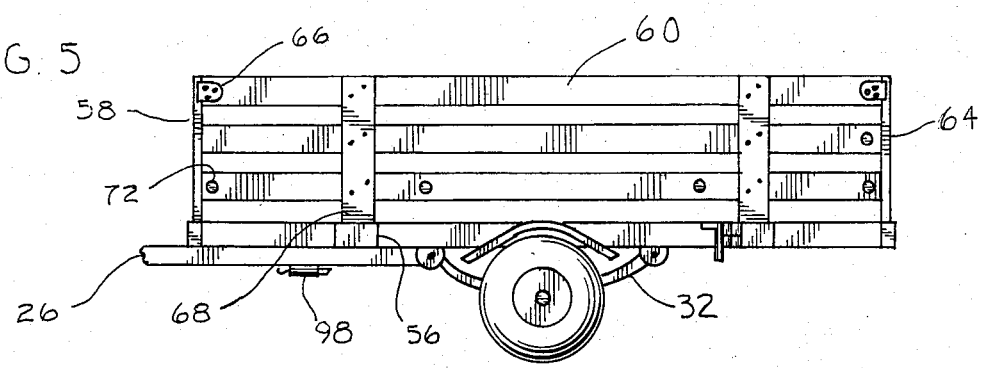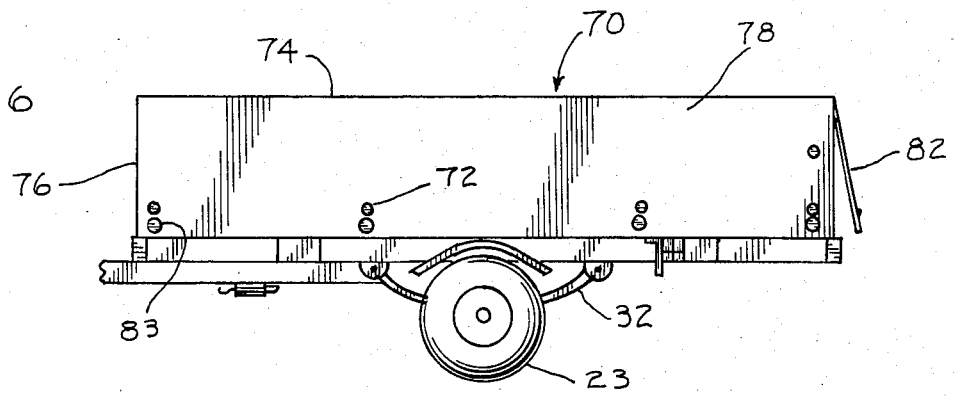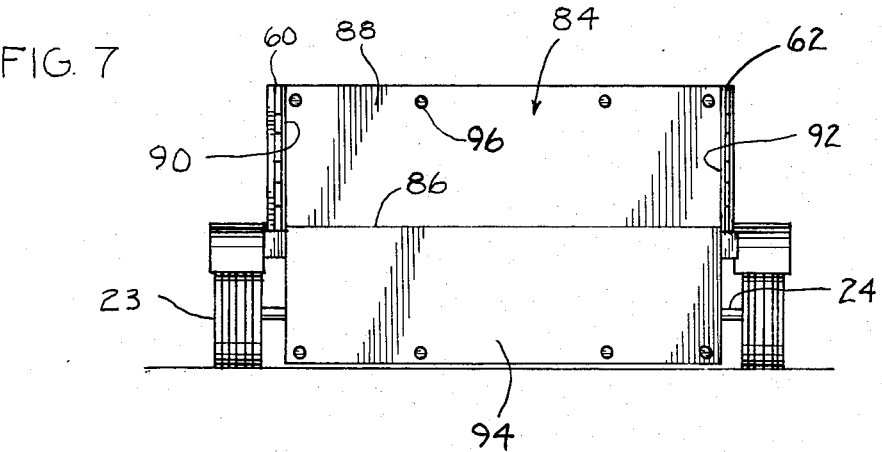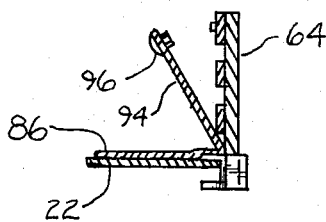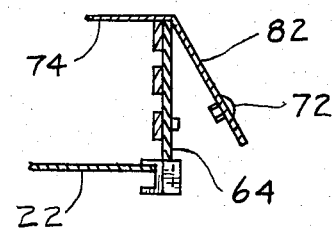

4,511,181

TILT BED VERTICALLY STORABLE UTILITY TRAILER

BACKGROUND OF THE INVENTION

In the past various types of utility trailers have been provided of the type that are towed behind a car or other vehicle. Such trailers are of varied construction and provisions has been made for tilt bed construction in order that a small wheeled vehicle may use the tilted bed as a ramp in a loading operation. This is advantageous for loading of motorcycles, snowmobiles, riding lawnmowers and the like.

Such utility trailers are often used only occasionally and storing because of the space required has presented a problem. While some trailer constructions lend themselves to vertical storage to minimize storage space by special fabrication a need has existed for a simply constructed utility traler having the dual capacity of tiltable bed and vertical storage.

SUMMARY OF THE INVENTION

By means of this invention there has been provided a light weight utility trailer of substantially standard bed construction which by a uniquely pivoted tongue has the capability of a tiltable bed for easy ramp-like loading and by a further pivoting of the tongue can be moved so as to be supported on its end in a vertical position with the tongue propped on the ground to form a tripod-like storing position.

The tongue is formed of an elongated rigid draw bar which is pivoted to an intermediate portion of the underside of the bed in order that the tongue and bed may be pivoted with respect to one another. The extent of the pivotal movement in the tilt bed mode is through an acute angle while the vertical storing mode provides pivoting through an obtuse angle.

The length of the tongue and the placement of the pivot connection to the bed is of such relationship that when the bed is placed on its rear end in the vertical storing position the tongue may be pivoted downwardly to engage the ground to provide with the end of the bed a tripod-like ground support position.

The tongue is provided with a cammed latch which automatically locks the bed to the tongue as it is lowered from the tilt position to the horizontal towing position. The bed is simply tilted by releasing the latch and causing the rear end of the bed to lower toward the ground. This lowering is by pivoting the bed about the pivot connection of the bed and the tongue and may be effected by an unbalanced weight on the rear of the bed such as by a person standing on the bed.

An additional latch is provided to secure the tongue to a wheel axle extending underneath the trailer bed. This latch securely locks the tongue in a fixed position in the vertical storing position to prevent collapse of the tripod-like structure.

For protection of cargo on the trailer bed removable stakes may be provided on the sides and ends of the trailer. For economy of space in the vertical storing position the stakes may be removed and stored on end between the axle and the bed of the trailer in the vertical storing position.

For further protection of cargo the stakes are provided with snap-buttons receiving an inner liner and outer cover. These are provided with end flaps to facilitate loading.

The utility trailer is of simple, light weight construction and can be efficiently handled in all of its modes for towing, tilt bed loading and vertical storing in a minimum of space.

The above features are objects of this invention and further objects will appear in the detailed description which follows and will be otherwise apparent to those skilled in the art.

For the purpose of illustration a preferred embodiment is shown in the accompanying drawing. It is to be understood that the drawing is for the purpose of example only and that the invention is not limited thereto.

IN THE DRAWING

FIG. 5 is a view similar to FIG. 2 showing the trailer equipped with stakes;

FIG. 6 is a view similar to FIG. 5 showing a cover for the stakes;

FIG. 7 is a view in end elevation of the trailer equipped with stakes and an internal liner;

FIG. 10 is a fragmentary view in vertical section at the end of the trailer on its longitudinal axis showing the connection of the end flap of the liner to the end stakes; and FIG. 11 is a fragmentary view in vertical section at the end of trailer on its longitudinal axis showing the connection of the end flap of the cover to the end stakes.

DESCRIPTION OF THE INVENTION

Figure 1:
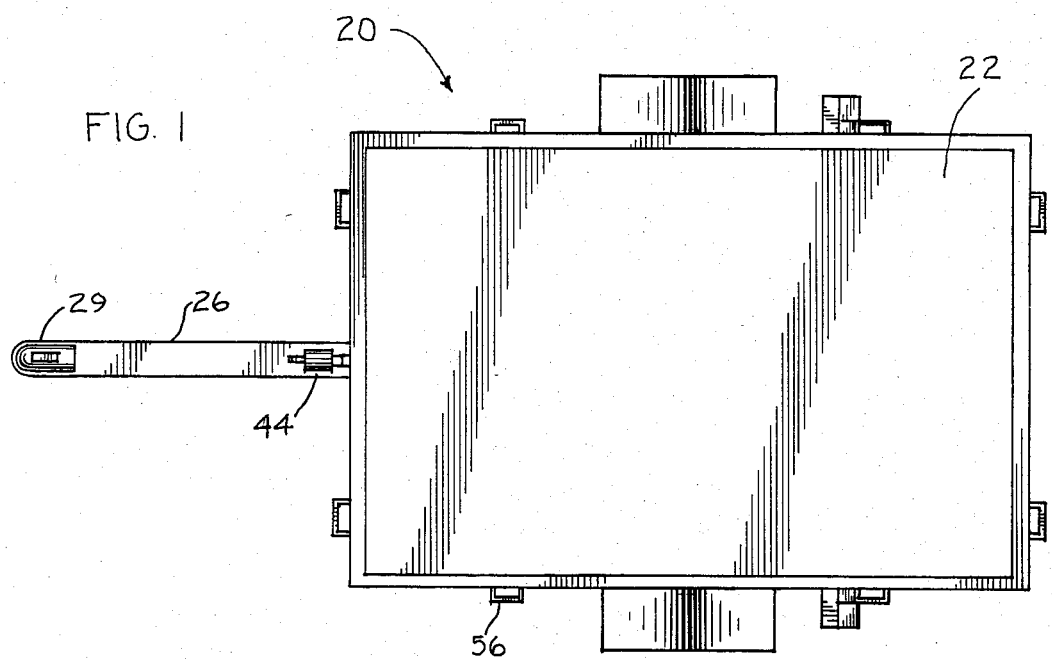
FIG. 1 is a top plan view of the trailer.
Figure 2:
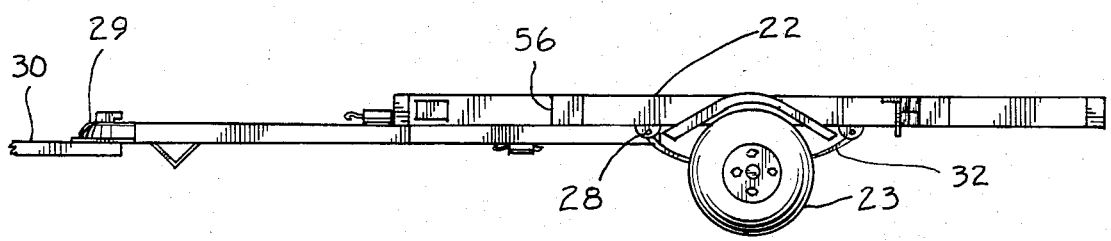
FIG. 2 is a view in elevation taken from the left side of the trailer.
Figure 3:
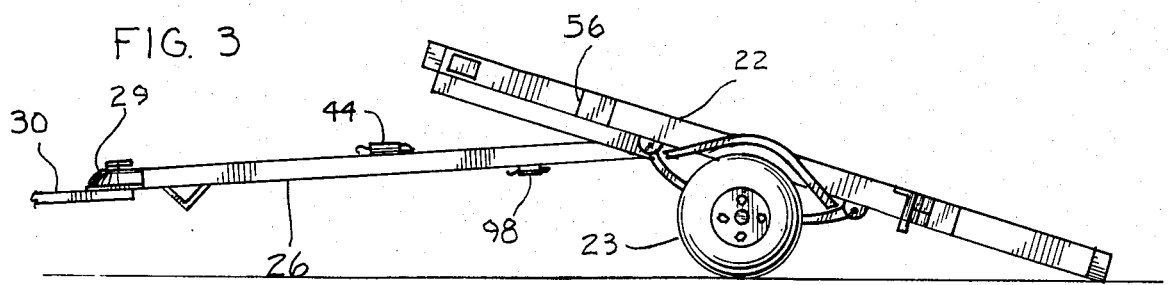
FIG. 3 is a view similar to FIG. 2 showing the bed tilted.

The trailer of this invention is generally indicated by the reference numeral 20. It is comprised of a flat bed 22 supported by a pair of wheels 23 upon an axle 24. A tongue 26 is pivotally connected underneath the bed by a pivot pin 28 and is provided with a conventional socket type hitch 29 which may be hitched to a draw bar 30 as shown in FIGS. 2 and 3.

As best shown in FIGS. 2, 3, 8 and 9 the axle is supported underneath the trailer bed in spaced relation thereto a substantial distance to receive stakes as will further appear and is connected to springs 32 which are fixed at their ends to cross braces 34 and 36. A pair of longitudinal guide members 38 and 40 are connected to the brace 34 and a cross brace 42 at the front end of the underneath side of the trailer to form a recessed area in which the tongue is nested to provide a support therefore in the trailer towing position. The afore-mentioned pivot pin 28 is journalled within the longitudinal guide members 38 and 40 and provides for the pivoting movement between the tongue and the trailer bed as will be further described.

Figure 4:
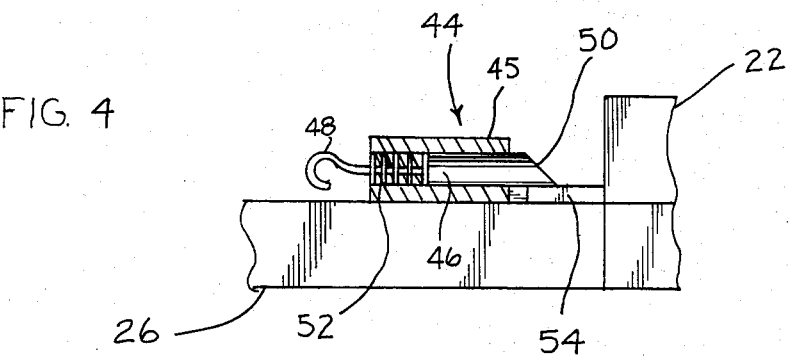
FIG. 4 is an enlarged view in vertical section through the axis of the bed latch.

A latch 44 is mounted on the tongue to lock the bed and the tongue together for the towing position or mode. The latch is unlocked to permit the tilting of the bed as shown in FIG. 3 for the simple loading of any type of wheeled cargo such as a riding mower, motorcycle, snowmobile or the like. The latch comprises a housing 45 supporting for reciprocal operation a spring loaded latch member 46 having an operating handle 48 and a cammed surface 50. Biasing spring 52 urges the latch member as shown in FIG. 4 into locking engagement with a locking lug or keeper 54 at the front of the trailer bed. The cammed surface provides for automatic retraction of the latch member by engagement with the lug 54 as the bed is lowered from a tilt position as shown in FIG. 3 to the towing mode of FIG. 2 when the latch member locks against the top of the lug.

The flat bed of the trailer is further provided with a plurality of pockets or sockets 56 at the periphery of the trailer to receive removable stake panels. Individual stake panels or stakes are provided in the form of front stakes 58, side stakes 60 and 62 and rear stakes 64. Conventional pin and socket connectors 66 are provided at the top corners of each of the stake panels in order that the panels may be simply connected together and taken apart as desired. Each of the stake panels is further provided with downwardly protruding bayonet extensions 68 which are insertable in the pockets 56 to connect the stakes to the trailer bed.

As best shown in FIGS. 5 and 6 a cover 70 is provided for protection of cargo inside the trailer. Conventional snap buttons 72 of the male and female segmented type are employed with one segment being formed in the cover and the other segment being supported on the exterior of the stake panels. The cover may be constructed of vinyl plastic, canvas or the like and is comprised of a top panel 74, front panel 76, side panels 78 and a rear flap panel 82. The front and side panels are sewn together or otherwise connected at the front corners to fit snugly over the stakes. The rear flap panel is formed as an extension of the top and is not connected at the sides in order that it may be opened and laid back over the top to provide access to the interior when the rear stakes are removed. Grommets 83 are further provided at the bottom of the cover for connection to tie-downs where needed.

In addition to the cover a liner 84 may be employed to cover the bed and the inside of the stakes. The liner is constructed similarly to the cover but somewhat smaller to nest inside the stakes. The liner is comprised of a floor panel 86, front panel 88, side panels 90 and 92 and a rear or end flap 94. The side panels and front are sewn or otherwise connected at the front to form a tight structure and are connected to the interior sides of the stakes by segmented snap buttons 96 in much the same fashion as the cover is connected to the outside of the stakes. The end flap is not connected to the sides in order that when the rear stakes are removed it may be dropped down to facilitate loading.

Figure 8:
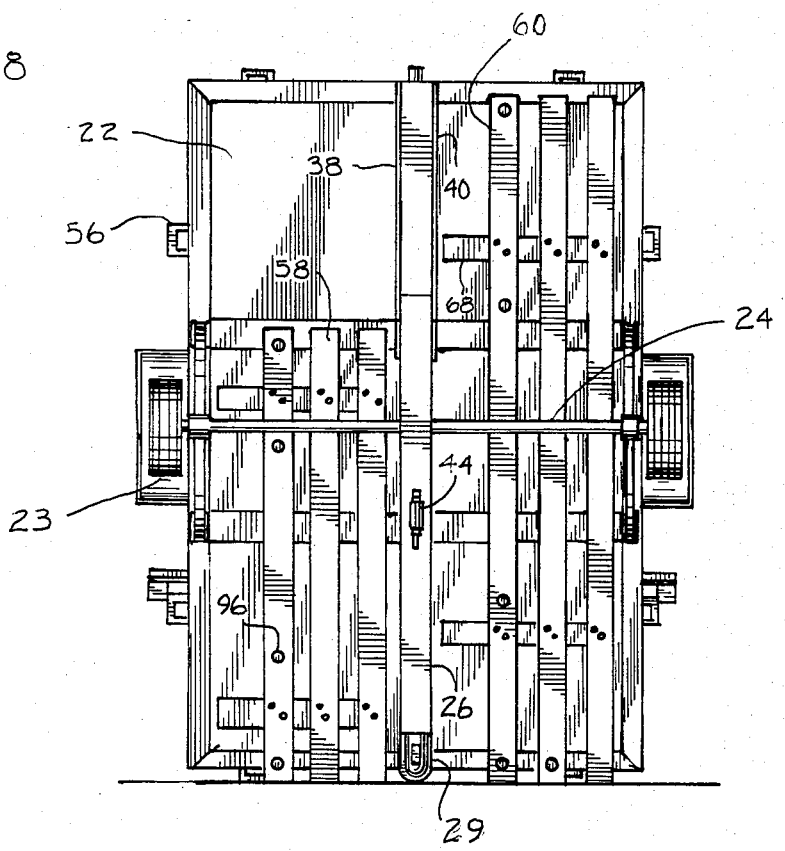
FIG. 8 is a view in front elevation showing the trailer in vertical storing position with the stakes stored.
Figure 9:
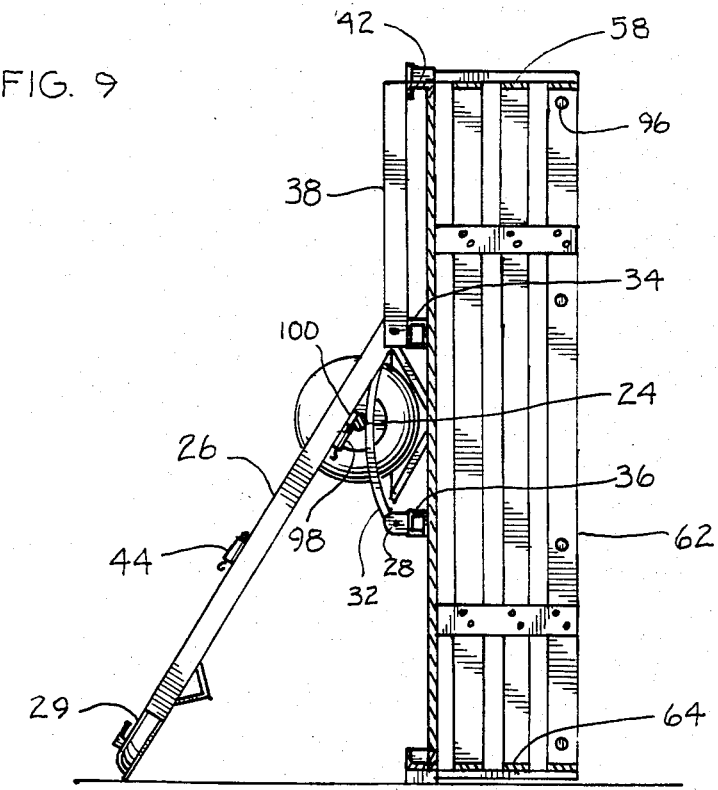
FIG. 9 is a view in vertical section through the longitudinal axis taken from the left side of the tongue of the stake equipped trailer showing the trailer in the vertical storing position.

The trailer is simply moved to the vertical storing position shown in FIGS. 8 and 9. This is effected by unlatching the bed latch 44 and lifting the trailer through the positions shown in FIGS. 2 and 3 to support the trailer in the vertical position on the squared rear end of the bed. With the trailer in the vertical position the tongue is pivoted to the tripod position shown in FIG. 9.

In the vertical storing position the stakes may be left attached or where floor space is needed they may be removed and stored on end as shown in FIG. 8 in the space between the axle and the bed on either side of the tongue.

In order to keep the tongue from collapsing an axle latch 98 is provided to lock the tongue to a lug or keeper 100 provided on the axle. The latch is of the same construction as the bed latch including the cammed surface of the latch member to ensure automatic locking of the tongue in the tripod mode as it is moved to the vertical storing position.

OPERATION

The operation of the trailer is simple and efficient. In the hitched position connecting the tongue or draw bar 26 behind a vehicle the trailer may be hitched and unhitched easily in view of its light weight.

In order to tilt the trailer when the trailer is in the hitched position for loading or unloading of a vehicle such as a riding lawnmower, motorcycle, snowmobile or the like the bed latch 44 is retracted to unlock the bed 22 while the front of the bed is pushed upwardly or force is applied on the rear of the bed. By the application of such force the front of the bed is tilted upwardly and the rear of the bed is lowered toward the ground. When the rear of the bed is fully lowered upon the ground the vehicle to be loaded is driven upon the tilted bed which acts as a ramp and as the vehicle progresses forwardly upon the tilted bed its weight causes the bed to be lowered to the rest position. As the bed is lowered to the rest position the tongue bed latch is automatically operated to lock the bed in the rest position. This is effected by the lug 54 engagement with the spring biased latch cam surface 50 which is retracted as the bed is lowered and which snaps into the lock position to engage the top side of the lug in the final rest position.

The trailer may be operated either as a flat bed trailer or with the stakes 58, 60, 62 and 64 attached to the sides and the front and rear of the trailer bed. The erection of the side and front and rear stake panels is simply effected by placing the stake extension prongs 68 in the bed pockets 56 and interfitting the male and female socket connections 66 at the corners to provide a rigid stake structure.

When the stakes are employed the liner 84 is easily inserted in the interior of the stakes and connected thereto. The floor 86 of the liner is supported by the trailer bed and the sides 90 and 92 and the front end 88 and rear end 94 are snapped to the snap button connectors 96 supported on the interior of the stakes. The sewn corners connecting the opposite sides to the front of the liner provide a protective and tight liner for protection of the cargo. Loading may be simply effected over the sides or from the rear by unsnapping the end flap 94 and removing the end stake panel 64.

For further protection of the cargo the protective cover 70 may be utilized. The cover is simply connected by placing it over the stakes and connecting the sides 78 and front end 76 and rear end 82 to the corresponding stakes by the snap buttons 72 on the exterior of the stakes. Access to the interior may be effected from the rear by unsnapping the end flap and removing the rear end stake panel 64. The sewn corners connecting the sides with the front end of the cover provide a secure water tight protection for the cargo against the elements. Should the cargo extend somewhat above the top of the stakes the snap buttons may be disengaged and the cover grommets 83 secured by tie-downs, ropes or the like.

After use the trailer may be simply stored in a garage or the like in the vertical position to occupy a minimum of floor space. The vertical storage position is simply effected by unlatching the bed latch 44 connecting the tongue 26 to the trailer bed 22 and grasping the front end of the trailer bed and moving the trailer to the vertical position. In this position the squared rear end rests on the floor or ground support and the unhitched tongue 26 is lowered into ground engagement as shown in FIG. 9 and with the corners of the bed a rigid tripod-like support is formed. The positioning of the wheels and axle inside the tripod-like structure provides great stability due to their weight and location of center of gravity. As the tongue is lowered the axle latch 98 is automatically engaged by the spring loaded cam engagement with the keeper lug 100 on the wheel axle 24. Alternatively where ceiling space permits, the tongue may be left latched while the trailer is moved to the vertical position for more leverage and unlatched when the elevation has been completed.

The vertical storage operation may be effected with the stakes connected or removed from the bed. For further conservation of floor space and reduction of weight the stakes may be removed before or after the vertical storing operation. After this operation the stakes may be placed on their ends on either side of the tongue between the tongue and the side wheels in the space between the axle and the underneath side of the bed.

Various changes and modifications may be made within this invention as will be apparent to those skilled in the art. Such changes and modifications are within the scope and teaching of this invention as defined in the claims appended hereto.

What is claimed is:

1. A vehicular trailer having a bed and means supporting wheels for said trailer, an elongated tongue having pivot means pivotally connecting a rear end of the tongue to the trailer underneath said bed, a forward end of said tongue having hitch means for connecting the trailer to a vehicle, said trailer bed being tiltable about said pivot means in a trailer hitched position to a substantially ground engaging position for a rear end of said bed, said trailer being supportable in a storing position upon a ground support surface with the bed in a substatially vertical position and the rear end engaging the ground and said tongue being pivotable about said pivot means to engage the forward end of the tongue in supporting relation with the ground, an axle supported underneath said bed rearwardly of said pivot means and locking means provided to secure an intermediate portion of said tongue to the axle in the storing position.

2. The trailer of claim 1 in which the tongue has a length between the pivot means and the forward end to support the trailer in the storing position with the bed extending in a substantially vertical position.

3. The trailer of claim 1 in which said bed is provided with means for securing removable stake sections at opposite sides and front and rear ends of the trailer, said axle being spaced from a bottom side of the bed a sufficient distance to receive said stake sections therebetween in the trailer storing position.

4. The trailer of claim 1 in which said bed is provided with means for securing removable stake sections at opposite sides and front and rear ends of the trailer and means are provided for removably securing an internal liner to said stakes, said means comprising cooperating snap button members supported on the liner and the stakes, said liner having opposite sides, a front and a floor and an end flap connected to said floor, said floor being connected at opposite front corners of the liner and the end flap being free of connection to the sides.

5. The trailer of claim 4 in which means are provided for securing an external cover to said stakes, said means comprising cooperating snap button members supported on the cover and the stakes, said cover having opposite sides, a front and a top and an end flap connected to the top, said cover having a vertically extending front end portion connected to a front portion of the opposite sides and an end flap free of connections to the sides.

6. The trailer of claim 1 in which said bed is provided with means for securing removable stake sections at opposite sides and front and rear ends of the trailer and means are provided for removably securing an external cover to said stakes, said means comprising cooperating snap button members supported on the cover and the stakes, said cover having opposite sides, a front and a top and an end flap connected to the top, said top being connected at opposite front corners of the bed to the sides and front of the cover and the end flap being free of connection to the sides.

* * * * *